United States Patent
Chen et al.

(10) Patent No.: US 9,824,154 B1
(45) Date of Patent: Nov. 21, 2017

(54) SEARCH ENGINE QUERY CUSTOMIZATION AND SEARCH SITE RATING SYSTEM

(71) Applicants: Steve Y Chen, Skokie, IL (US); David Y Chen, Arlington Heights, IL (US)

(72) Inventors: Steve Y Chen, Skokie, IL (US); David Y Chen, Arlington Heights, IL (US)

( * ) Notice: Subject to any disclaimer, the term of this patent is extended or adjusted under 35 U.S.C. 154(b) by 329 days.

(21) Appl. No.: 14/707,073

(22) Filed: May 8, 2015

Related U.S. Application Data

(63) Continuation of application No. 12/619,520, filed on Nov. 16, 2009, now Pat. No. 9,043,314.

(51) Int. Cl.
*G06F 7/00* (2006.01)
*G06F 17/30* (2006.01)

(52) U.S. Cl.
CPC .... *G06F 17/30867* (2013.01); *G06F 17/3053* (2013.01); *G06F 17/30112* (2013.01); *G06F 17/30598* (2013.01)

(58) Field of Classification Search
CPC ................................................ G06F 17/30112
See application file for complete search history.

(56) References Cited

U.S. PATENT DOCUMENTS

2007/0214121 A1* 9/2007 Ebanks ............ G06F 17/30867

* cited by examiner

*Primary Examiner* — Ajith Jacob
(74) *Attorney, Agent, or Firm* — Michael J. Feigin, Esq.; Feigin & Fridman

(57) ABSTRACT

A method and system are provided for web search customization and web site rating. The system receives user input web sites, stores the web sites in a database, and groups them into user-specified categories. The system further allows users to select one or more web sites for customizing web search and querying the preselected sites using user input keywords. The system further provides the users with options to query a plurality of search engines. All web sites stored within the system are rated in response to the user operations. Each web site has at least a global rating indicating the rating within the system, a category rating indicating the rating within a given category, and a keyword rating indicating the rating for a given keyword. The system provides the users with a list of recommended web sites based on the web sites' ratings.

3 Claims, 10 Drawing Sheets

MAIN SITES TABLE 250

| WEB SITE | RATING |
|---|---|
| SITE 1 | 3 |
| SITE 2 | 1 |
| SITE 3 | 4 |
| SITE 4 | 6 |
| SITE 5 | 10 |
|  |  |
|  |  |
|  |  |
|  |  |

FAVORITE SITES TABLE FOR "JOE" 260

| WEB SITE |
|---|
| SITE 20 |
| SITE 4 |
|  |
|  |
|  |

FAVORITE SITES TABLE FOR "MIKE" 265

| WEB SITE |
|---|
| SITE 3 |
| SITE 11 |
| SITE 32 |
|  |
|  |
|  |

FIGURE 2D

TABLE FOR THE "GUITAR" CATEGORY 270

| WEB SITE | RATING |
|---|---|
| SITE 1 | 2 |
| SITE 2 | 1 |
| SITE 3 | 3 |
|  |  |
|  |  |
|  |  |
|  |  |
|  |  |

FIGURE 2E

TABLE FOR THE KEYWORD1 280

| WEB SITE | RATING |
|---|---|
| SITE 1 | 2 |
| SITE 2 | 5 |
| SITE 3 | 1 |
|  |  |
|  |  |
|  |  |
|  |  |
|  |  |

FIGURE 2F

MAIN SITES TABLE 282

| USER | SITE | CATEGORY | SITE NOTE |
|---|---|---|---|
| Joe | Site 1 | Category 1 | Note 1 |
| Mike | Site 2 | Category 2 | Note 2 |
| Joe | Site 20 | | |
| Joe | Site 23 | | Note 23 |
| Mike | Site 11 | Category 5 | |
| Mike | Site 20 | | |
| | | | |
| | | | |
| | | | |

CATEGORY TABLE 284

| CATEGORY | SITE | RATING |
|---|---|---|
| Category 1 | Site 1 | 12 |
| Category 2 | Site 2 | 2 |
| Category 3 | Site 20 | 33 |
| Category 3 | Site 23 | 5 |
| | | |
| | | |
| | | |

KEYWORD TABLE 286

| KEYWORD | SITE | RATING |
|---|---|---|
| Keyword 1 | Site 1 | 5 |
| Keyword 2 | Site 2 | 34 |
| Keyword 2 | Site 3 | 110 |
| Keyword 3 | Site 1 | 5 |
| | | |
| | | |
| | | |

FIGURE 2G

SEARCH ENGINE QUERY CUSTOMIZATION AND SEARCH SITE RATING SYSTEM

TECHNICAL FIELD

The present invention relates generally to the field of web search and specifically to techniques for customizing internet search via user-specified web sites and site rating.

BACKGROUND OF THE INVENTION

Web search engines, such as GOOGLE, MICROSOFT BING, YAHOO!, are designed to search for information on the World Wide Web. The search results are usually presented in a list and are commonly called hits. The information may consist of web pages, images, documents and other types of files. Some search engines also mine data available in databases or open directories.

Web searches are primarily done via keyword queries that present users with results (i.e., hits) linked to web sites containing the queried keywords. The results usually contain a mixture of sites the user may or may not have seen before. While users are often searching for new sites, many users usually have a list of preferred sites on which they prefer to conduct the search in different topics. Searching particular sites is possible through writing complex custom query strings for various search engines, which is very inconvenient to the users.

Currently, there are no existing systems for storing and automatically choosing custom user specified web sites for limiting the scope of a web search. There is a need, therefore, for techniques that allow users to store and conveniently apply custom user-specified preferences for querying multiple search engines at the same time.

BRIEF SUMMARY OF THE INVENTION

Within the context of this invention, the terms "web site," "web site's URL," and "web site's IP address" are considered interchangeable.

Described herein is a method, system and computer implementation for providing a user with web search customization and web site rating.

Specifically, the user is allowed to submit a list of web sites that he or she wishes to search via a keyword search. A note can also be attached to or associated with each web site for the purpose of further identification. The user can also create categories or groups to group these websites. Within the scope of this invention, the terms "category" and "group" are considered interchangeable.

With respect to search customization, the user can specify a keyword or keywords to query or conduct a search on the Internet. The user is allowed to select one or more web sites for searching. When the web sites are selected, they are combined with the user-input keyword for conducting the keyword search. Alternatively, the user can select a category for conducting the keyword search. Accordingly, all the sites under that category are combined with the user-input keyword for the web search. Furthermore, the users can select multiple sites and categories for the keyword search.

After the user inputs the keyword and selects the web sites, query strings are created for a plurality of search engines, such as GOOGLE, MICROSOFT BING, and YAHOO!. Additionally, the user can search for documents based on file extension and document type.

According to another embodiment, a method is provided for web site rating. The web sites input by the users are numerically rated based on user operations and search activities. For example, every time a user adds a web site, the rating of the web site will increase. Every time the user selects a web site for keyword search, the rating also increases. When a site is removed from a category, the rating decreases. Commercial web sites can purchase points to increase the rating of their sites.

On the search results page, the results from one search engine are displayed to the user, along with links to the results from other search engines. In addition to these results, a set of suggested sites is also displayed. These suggested sites are determined based on the ratings of the web sites for the same category and/or for similar keywords. On the suggested sites list, the web sites are ordered based on their rating, from the highest to the lowest. Selecting a suggested site brings the user to a page displaying the search results obtained from that web site using the user-specified keyword. Additionally, the user has the option to add the selected site into his or her site list.

In keeping with various embodiments, a method is provided for customizing search engine queries. The method comprises receiving user input comprising one or more web sites, grouping the one or more web sites into one or more categories, receiving another user input for selecting at least one of the one or more web sites under at least one of the one or more categories, and conducting a user-initiated keyword search on the at least one selected web site associated with the one or more categories using at least one search engine.

In keeping with some alternative embodiments, a method is provided for rating web sites. The method includes receiving user input comprising one or more web sites, grouping the one or more web sites into one or more categories, and rating the one or more web sites in accordance with predetermined criteria associated with the one or more categories.

In keeping with still some alternative embodiments, a user interface is provided for the user to conduct web search customization. The user interface includes a web site input field for receiving one or more web sites from a user, a category field for grouping the one or more web sites into one or more categories and for selecting at least one of the one or more web sites for conducting a keyword search, and a keyword field for receiving a search keyword from the user for conducting the keyword search on the selected at least one web site using one or more search engines.

BRIEF DESCRIPTION OF THE SEVERAL VIEWS OF THE DRAWING(S)

FIG. 2D depicts a favorite sites table for user "Joe" and a favorite sites table for user "Mike;"

FIG. 2E depicts a table associated with the "Guitar" category;

FIG. 2F depicts a keyword table associated with KEYWORD1;

FIG. 2G depict another embodiment where a main sites table, a category table, and a keyword table are used to manage the user-input websites and the web site ratings.

DETAILED DESCRIPTION OF THE INVENTION

Figure 1:
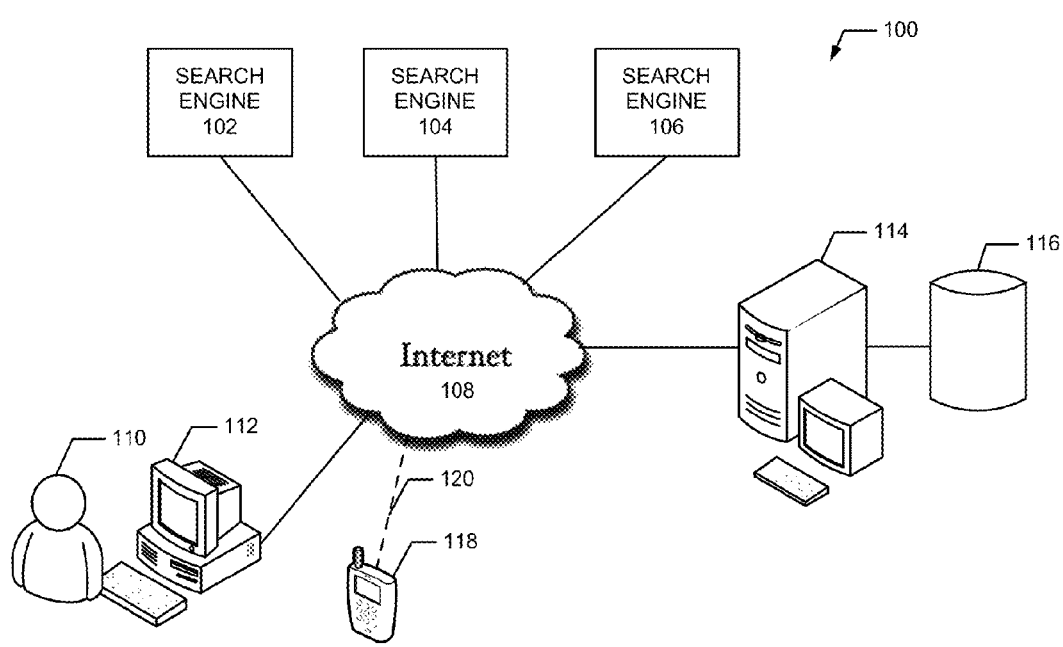
FIG. 1 depicts a system for providing web search customization and Internet site rating.

Now turning to the drawings and referring to FIG. 1, a system 100 is depicted therein according to one embodiment of the invention for customizing user-initiated web search and for rating web sites stored in a computer readable medium of a digital database.

System 100 includes an application server 114 for providing a web-based application services that customize user-initiated web search on the Internet and conducting web site rating. Specifically, the application server 114 includes one or more computer readable media 116 that store computer code for executing instructions comprising web-based application services. The computer codes for implementing the web-based application is executed by the application server 114 that is accessed by a user terminal 112 via a web browser over a network 108, such as the Internet or an intranet. As further shown in FIG. 1, a user terminal can also take form of a cell phone or smart phone 118 connected to the Internet 108 through a wireless connection 120. Similarly, the smart phone 118 can access the application 114 through the Internet 108 and render a mobile web browser for providing the web search customization functionalities described herein.

The web-based application is coded in a browser-supported language (such as HTML, JavaScript, Java, etc.) and relies on a common web browser (such as Internet Explorer, Firefox, Chrome, etc.) to render the application on the user terminal 112. In particular, when accessing the web-based application services provided by the application server 114, the user 110 starts a web browser on the user terminal 112 and inputs a URL or an IP address associated with the web-based application. In response to the connection request, the application server 114 transmits program codes in the form of the browser-supported language to the user terminal 112. Upon being executed by the web browser running on the user terminal 112, the program codes instruct the web browser to render user interfaces to interact with the user 110. According to the various embodiments, the user interfaces are designed to allow users to input search keywords, to input and identify web sites to customize web search, and to manage and group the web sites, and provide the users with search results and suggested web sites based on the web site ratings. The web search customization and web site rating are further discussed below.

Figure 2A:
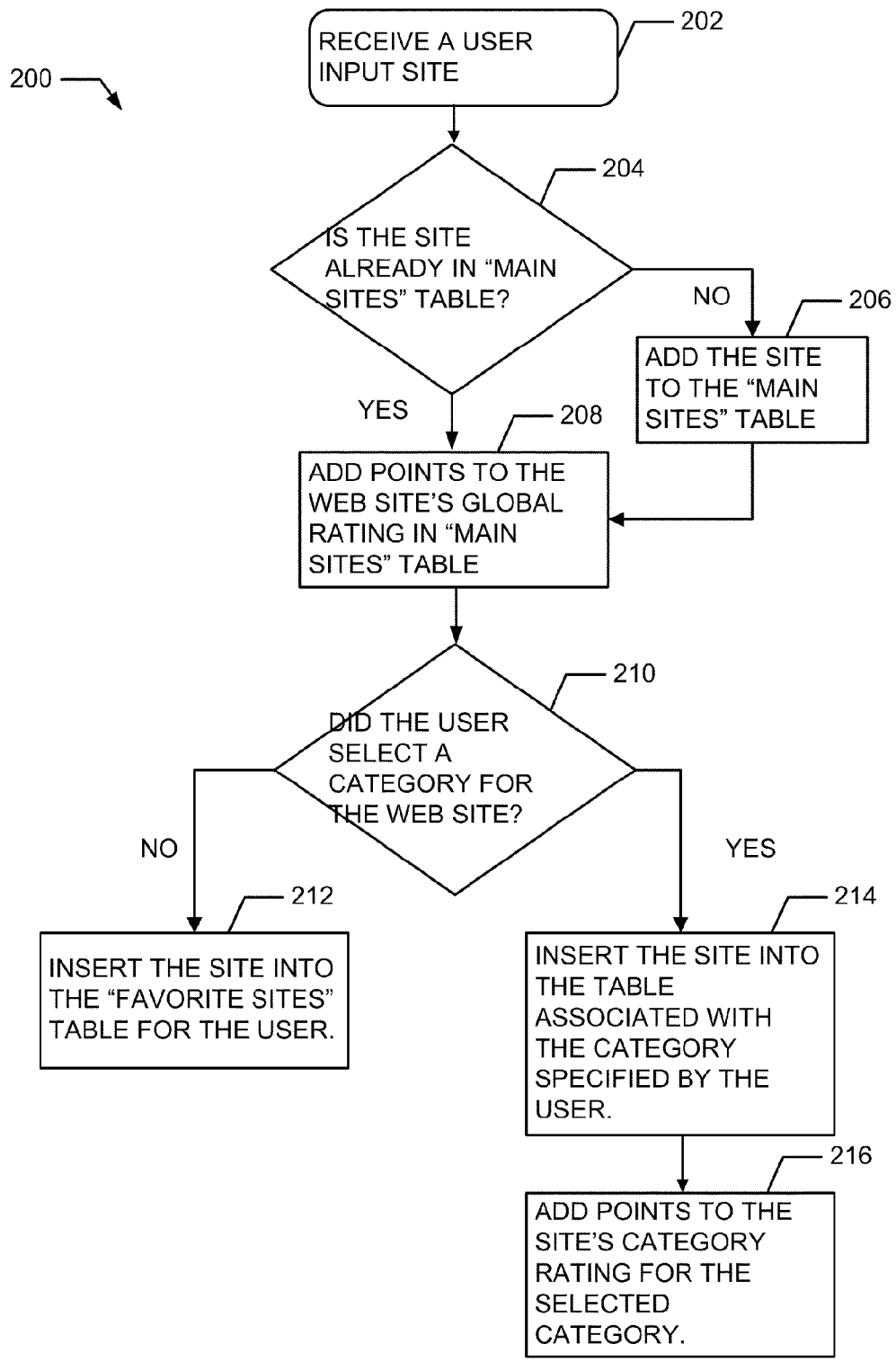
FIG. 2A depicts a method for storing, grouping, and rating web sites in a database.
Figures 2B, 2C:
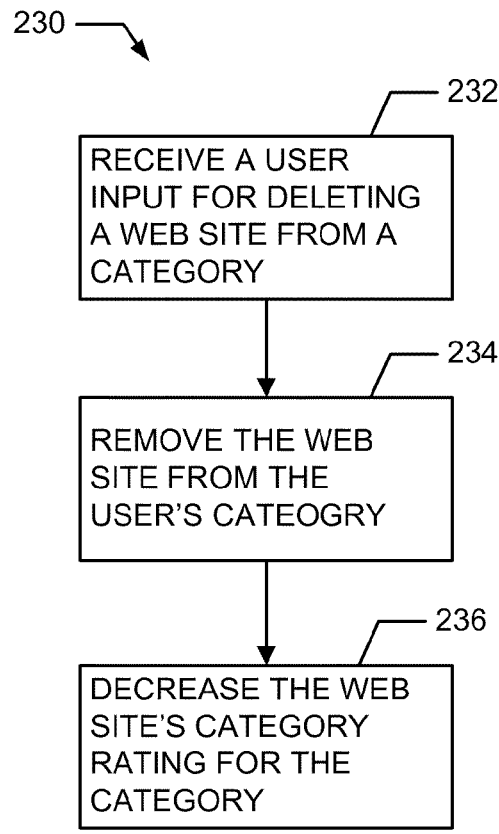
FIG. 2B depicts a method for deleting a web site from a category.
FIG. 2C depicts a main sites table for storing all user-input web sites and their global ratings.

The application server 114 further includes a database 116 for storing user-input web sites. The database 116 includes a plurality of tables for storing the web sites. Specifically, as shown in FIG. 2C, one of these tables is a main sites table 250 for storing the web sites input by all of the users of the system 100. For each user, the database also includes a favorite sites table for storing the sites that are indicated by the user or identified by the system as his/her favorite sites for purposes of conducting various searches thereon. For example, as shown in FIG. 2D, the database 116 includes a favorite site table 260 for user "Joe" and a favorite site table 265 for another user "Mike." According to an alternative embodiment, a plurality of users may share one favorite site table. For example, the favorite sites of users "Joe" and "Mike" are combined into a single favorite site table.

As shown in FIG. 2E, the database 116 also includes other tables, each associated with a group or category. According to one embodiment, these groups or categories are specified and input by users. For example, when a user creates a category or a group called "Guitar" and saves all the user's favorite guitar sites under that category, the server 114 then stores the user's guitar sites into a table 270 associated with the "Guitar" category and updates the ratings of the web sites that are input by the user. In one embodiment, these categories and sites are only associated with that particular user and are not available to other users of the system. Alternatively, when a user creates a category or a group (e.g., "Guitar" group) and saves all the user's favorite guitar sites under that category, the server 114 then stores the user's guitar sites into a table containing categories and sites for an entire user population along with a field tying each category and site to the specific user responsible for supplying that input. Alternatively, these categories are generated by the application server 114 automatically when receiving the user input web sites. For example, when the application server 114 receives a user input including a web site "www.fenderforum.com," it automatically generates a "Guitar" category for storing the web site.

As shown in FIGS. 2C and 2E, the main sites table 250 and the tables associated with the categories 270 include information, such as numerals under the "Rating"column indicating the rating of each web site saved therein. In particular, the "Rating" column in the main sites table 250 stores a global rating of each web site in the system, indicating the system-wide popularity of each web site. The "Rating" column in the table for each category, such as table 270 for the "Guitar" category, stores a category rating of each web site under that category, indicating the category-wide popularity of the web site.

The database 116 can take forms of SQL databases, OQL databases, proprietary databases, or other commercially available databases well known to one skilled in the art.

The application server 114 is designed to communicate with the search engines 102, 104, and 106, such as GOOGLE, MICROSOFT BING, YAHOO !, etc. As further described below, the web application running on the application server 114 allows the user 110 to select one or more web sites for customizing the keyword search on the search engines 102, 104, and 106.

FIG. 2 depicts a process 200, when executed by the web application, instructs the server 114 to receive, group and manage user-input web sites. The process 200 also instructs the server 114 to perform web site rating based on the user operations on the web sites. In keeping with the embodiment depicted in FIG. 2, the process 200 first instructs the server 114 to receive a user input web site (step 202) and determine if that web site is already in a main sites table in the database 116 (step 204). If the newly entered web site does not exist in the main sites table, the web site is added to the main sites table as a new entry (step 206) and an initial global rating is set for the web site. If, on the other hand, the web site has been previously entered and currently exists in the main sites table, a point or points are added to the global rating of the web site (step 208).

In step 210, the process 200 further instructs the server 114 to determine if a user has selected a category for the web site. If the user does not identify a category for the web site, the web site is entered into the favorite sites table associated with the user, such as table 260 or 265 (step 212). If, on the other hand, the user specifies a category for the newly entered web site, the web site is inserted into the table associated with the user-specified category (step 214). The category rating of the web site is increased for the selected category (216). For example, a point or points are added to the numerical rating of the web site stored in the table associated with the selected category.

Alternatively, a user input web site is assigned to a category according to the knowledge of the web sites available to the public or the application server 114. In another example, when the user inputs a web site "www.foodnetwork.com," an analysis is conducted on the web site by searching its introduction page and automatically assigning the web site to the "Cooking" category based on the search result. In an alternative example, when the user inputs the web site "www.foodnetwork.com," the favorite site table is searched to check whether this web site has already been input by other users, and the website is assigned to the category that the majority of users have assigned to the website.

FIG. 2B illustrates another process 230, when executed by the web application, instructs the server 114 to remove a web site from a category. According to FIG. 2B, a user input is received for deleting a web site from a user-selected category (step 232). The web site is removed from that category for that user (step 234). Accordingly, the global rating and the category rating of the web site is decreased for that selected category (step 236).

FIGS. 2C-2E illustrate exemplary embodiments for each of the main site table (250), the favorite site table for user "Joe"(260), the favorite site table for user "Mike" (265), and a table for the category "Guitar" (270). Each table has a "web site" column for storing the web sites that the user inputs. As discussed above, the main sites table 250 shown in FIG. 2C is a global table for storing all of the web sites input into the system 100. The favorite site table for each user (260 or 265), as shown in FIG. 2D, stores the web site identified by the user as his/her favorite sites or by the system when the user does not specify a category for the web site. The table 270 for category "Guitar" shown in FIG. 2E is used to store the web sites that are assigned to the "Guitar" category by all the users or the system. In addition, the main sites table 250 further includes a rating column for storing the global rating of each web site stored therein. Similarly, the "Guitar" table 270 also includes a rating column for storing the category rating of each web site under the "Guitar" category. One skilled in the art would understand that the system 100 has a plurality of users and a plurality of tables, each associated with different categories, such as a "Home" category table, a "Travel" category table, a "Music" category table, and the like.

As depicted in FIG. 2G, an alternative embodiment comprises one main site table 282 for storing the favorite sites of all users using the system 100. This table 282 contains all of the users, the web sites that they have inputted and the web site's assigned categories indicated by a category field. If a web site does not have an assigned category, the category field is left blank. Each site and its category are then tied to a user field for the purposes of limiting the ability to view and edit these sites and categories to individual users who input the site and category, if desired.

This embodiment further includes a category table 284 and a keyword table 286, which store the web sites, their ratings, their categories, and their ratings, respectively. Specifically, the category table 284 stores all of the categories inputted by the users and those sites that have been assigned to each of those categories. The rating field of table 284 stores the rating of each web site within its category. Similarly, the keyword table 286 stores all of the keywords that have been searched for by all the users and those web sites that have been selected by users for those keyword searches. The rating field of table 286 stores the rating of each web site for individual keywords.

In keeping with this embodiment, when a user first registers for the system 100, the system selects a number of default sites and default categories for the user. These sites and categories are selected by the system according to certain criteria. For example, when a person (e.g., a web site's owner) has an interest in a web site, this person can purchase the "spot" in the default sites and categories for the web site. For example, the default categories for a user include "SHOPPING," "SPORTS," and "HEALTH" categories. The "SHOPPING" category includes by default "ebay.com" and "amazon.com," the "SPORTS" category includes by default "ESPN.com," the "HEALTH" category include by default "webMD.com," etc. The user can then build upon this list or delete it completely if he wants.

Figure 3:
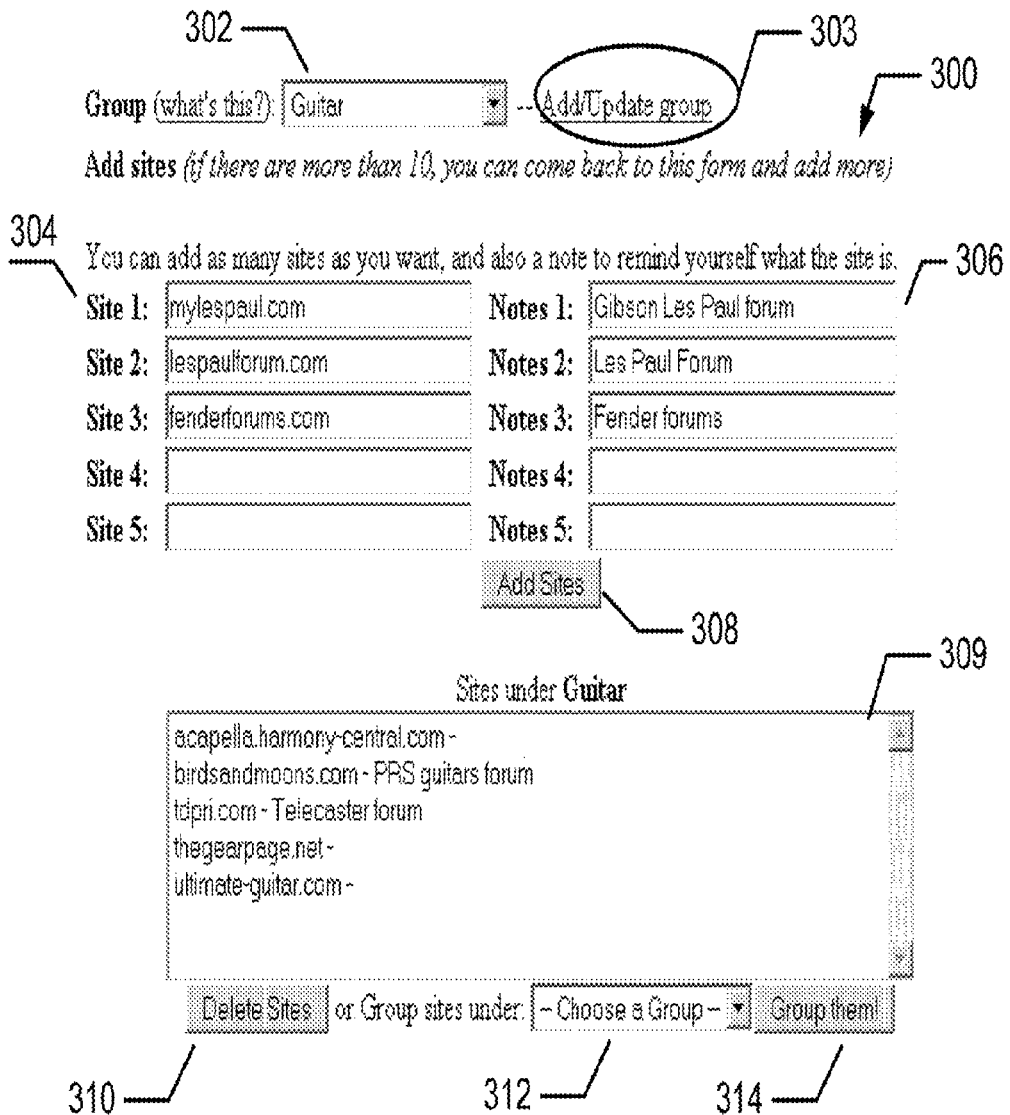
FIG. 3 depicts an exemplary user interface for inputting and grouping web sites.

FIG. 3 shows one embodiment of the interface. As shown in FIG. 3, the interface 300 includes a number of fields, such as text boxes, menus, and buttons, for the user to interact with the process 200. In particular, the interface 300 includes a group field 302 for a user to select a group or category to which the web sites are added. The interface 300 also includes a plurality of site fields 304 and note fields 306 for the user to inputting the web sites to be added to the database 116 and putting notes that help the user to identify the web sites in a later time. When the user clicks the add sites button 308, the web sites and their associated notes entered into the site fields 304 and note fields 306 will be transmitted to the database 116 and added into the group (e.g., "Guitar" group) identified in the group field 302. The web application on the application server 114 processes each of the web sites according to the process 200 depicted in FIG. 2A.

The interface 300 further includes a field 309 for displaying all of the web sites that are currently included in the group identified in group field 302. The user can further select individual web sites listed in field 309 and delete or regroup them. For example, the user can select and highlight the site "thegearpage.net" in field 309 using a mouse and click the delete sites button 310 to delete the "thegearpage.net" site from the "Guitar" group. Alternatively, the user can click the "Group them!" button 314 to regroup the "thegearpage.net" site into another group identified in the draw-down menu 312.

As discussed above, each time the user operates on the web sites through the interface 300, the processes 200 or 230 will be triggered to add or delete a web site and to adjust the rating of the web site according to the user operations.

Figure 4:
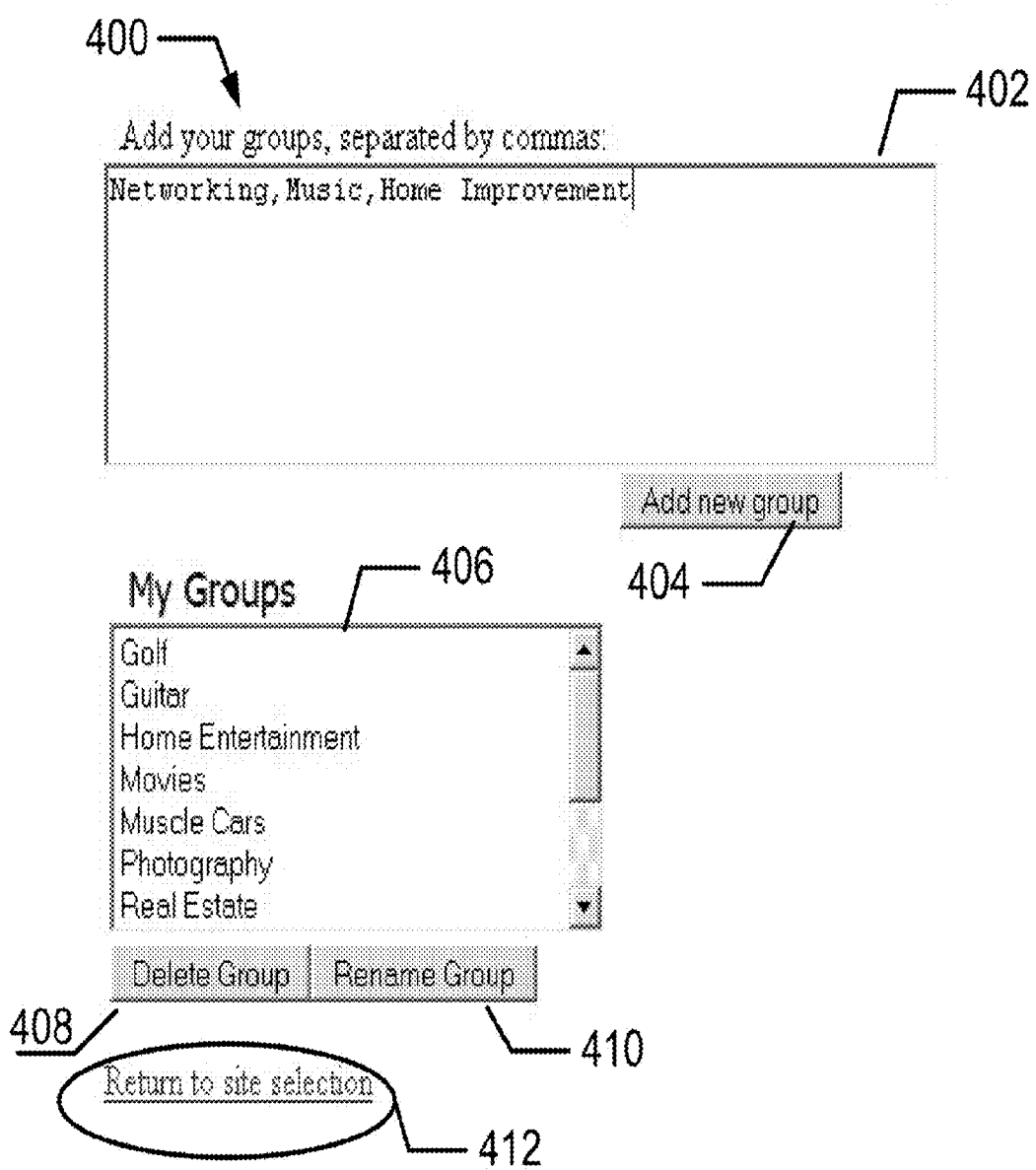
FIG. 4 depicts an exemplary user interface for managing groups specified by users.

The interface 300 further includes an "Add/Update group" link 303. When the user clicks the "Add/Update group" link 303, another interface 400 shown in FIG. 4 is rendered for the user to manage the groups under his/her account. As shown in FIG. 4, the interface 400 includes an add group field 402 for the user to input names of the groups to be added to his/her account. Once the user clicks the "Add new group" button 404, those groups listed in the add group field 402 are added into the group list 406. The user can also delete a group from the group list 406 by highlighting a group in the list 406 and clicking the "Delete group" button 408. Furthermore, the user can also rename a group by highlighting a group in the list 406 and clicking the "Rename Group" button 410. The interface 400 also includes a "Return to site selection" link 412 for returning to the interface 300 shown in FIG. 3.

Figure 5:
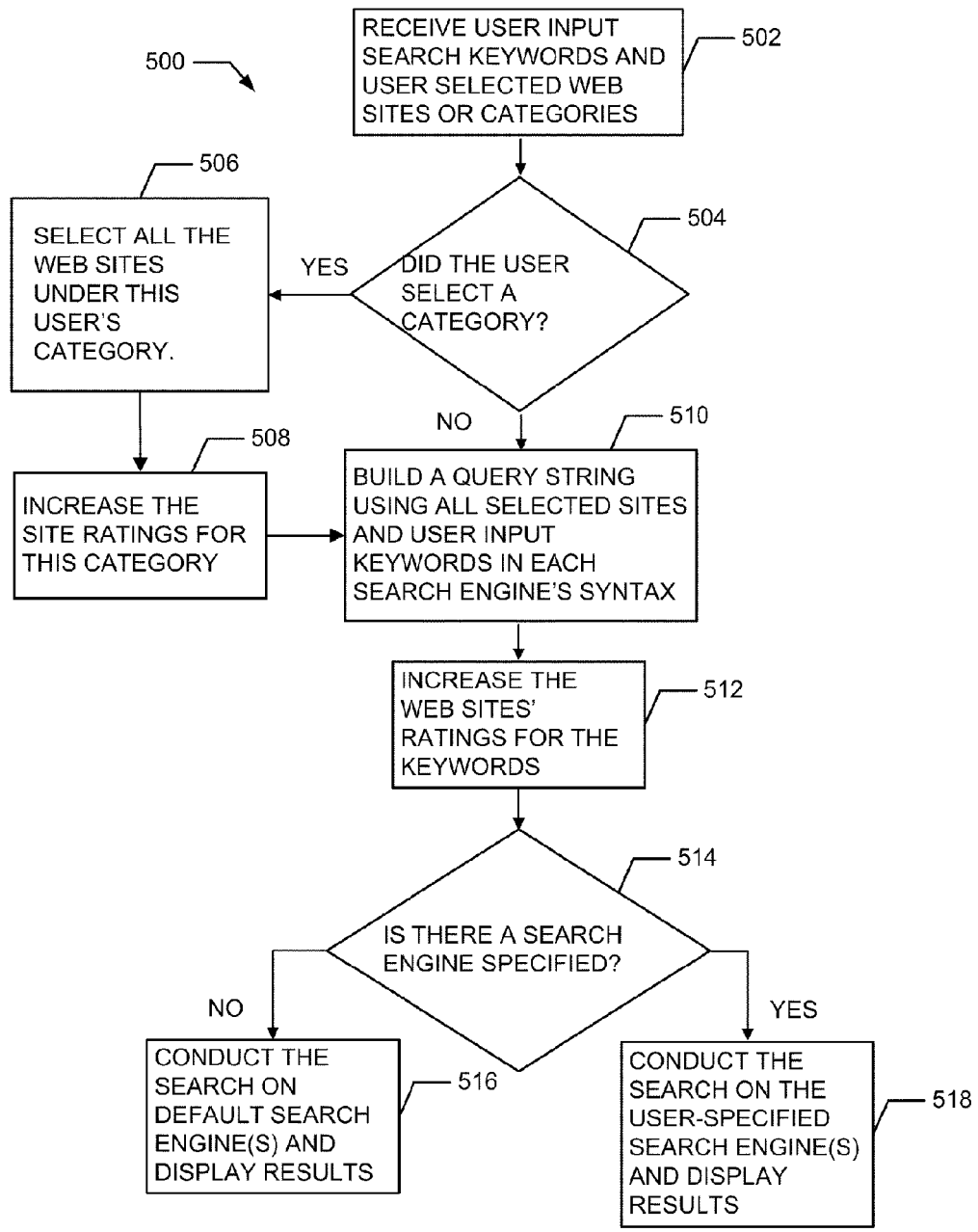
FIG. 5 depicts a method for customizing a user-initiated web search based on user-input keywords and user-identified web sites and rating the web sites according to the user initiated web search.

Now turning to FIG. 5, a process 500 is provided, which allows a user to customize the keyword search on various search engines and for rating the web sites stored in the database 116 based on the user-initiated search.

Figure 6:
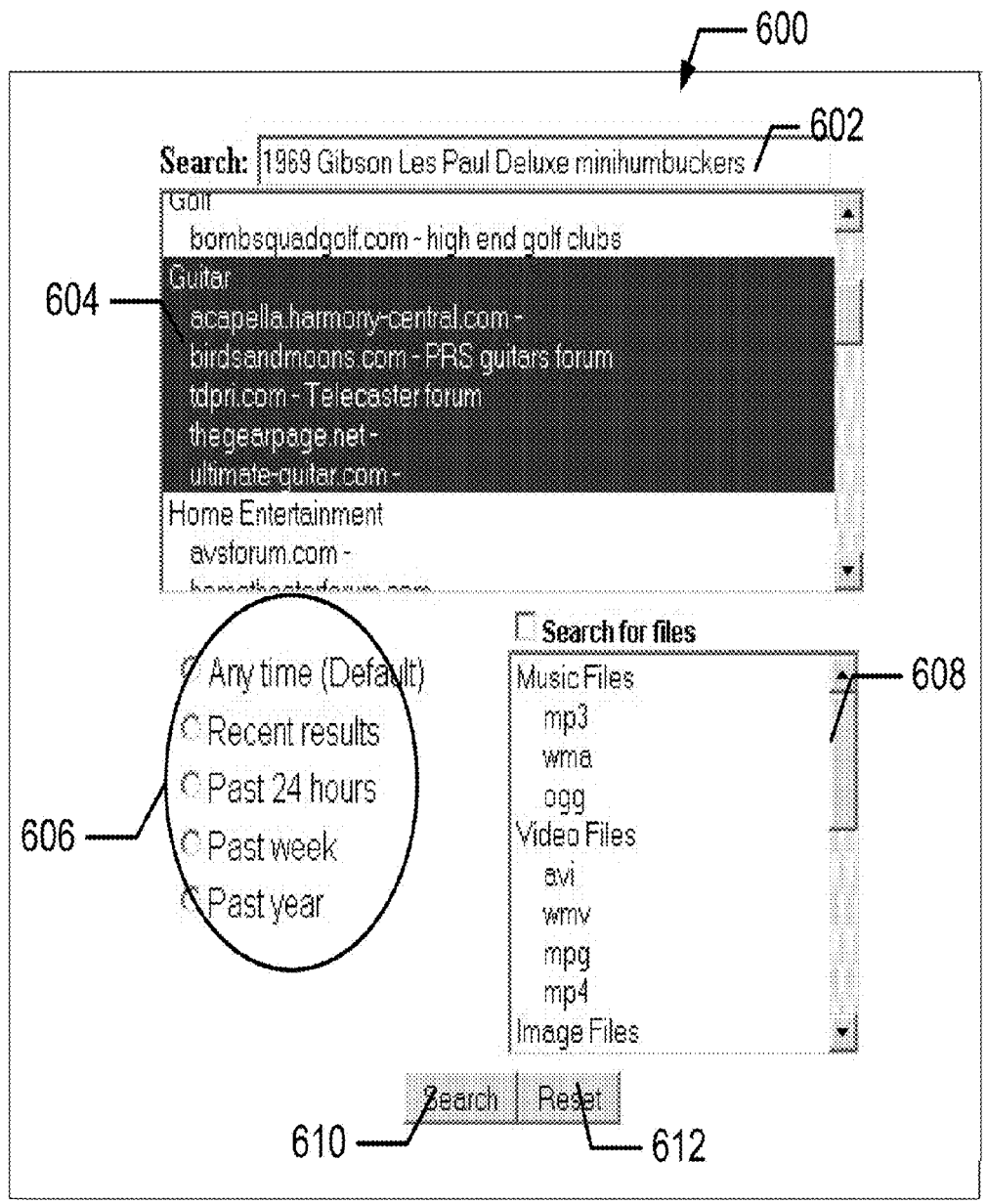
FIG. 6 depicts an exemplary user interface for customizing a user-initiated web search based on user-input keywords and user-identified web sites.

In particular, the process 500, when executed by the web application, instructs the server 114 to receive a keyword(s) input by the user (step 502). The user input also includes one or more web sites or categories selected by a user through the user interface provided by the web application (step 502). In step 504, the process 500 instructs the server 114 to determine if a user selects a category for conducting the keyword search (504). If a category is selected, all the web sites under the category are selected (step 506). In step 508, the global rating and the category ratings of these selected web sites are increased. As shown in FIG. 6, when the "Guitar" category is selected, the ratings of all of the web sites under user's "Guitar" category are increased. Alternatively, if only one web site, such as "thegearpage.net," is selected by the user, then only the ratings of the "thegearpage.net" site are increased. As described above, the change in the rating of a web site for a particular category is reflected in the table associated with the category. For example, when the rating of the "thegearpage.net" is increased, the corresponding rating field in table 270 is modified to reflect the change.

In step 510, a search string is generated based on the user input information for each of the search engines 102, 104, and 106. In particular, the search string includes a logical combination of the user input keywords and user-specified web sites. In addition, the search string is generated in a syntax provided by the specifications of the corresponding search engine. For example, assuming the user input keywords include "KEYWORD1 AND KEYWORD2" and the user-specified web sites include WEBSITE1 and WEBSITE 2, the search string may take the form of "KEYWORD1 AND KEYWORD1 SITE:WEBSITE1 SITE:WEBSITE2." Alternatively, the search string may be in the form of KEYWORD1 AND KEYWORD1 (SITE:WEBSITE1 OR SITE:WEBSITE2). After reading this specification, one skilled in the art will understand that the search string may take other forms that comply with the syntax of a particular search engine.

In step 512, a keyword rating of each web site selected by the user is increased. The keyword rating of a web site for a particular keyword indicates how many times the web site has been selected for searching that keyword. Referring to the above example, each of the WEBSITE1 and WEBSITE2 has a keyword rating for KEYWORD1 and a keyword rating for KEYWORD2. When the user selects WEBSITE1 and WEBSITE2 for conducting the keyword search, the keyword ratings of both web sites for the KEYWORD1 and KEYWORD2 are increased. In keeping with this keyword rating, the database 116 further includes a keyword table for each keyword for storing the web sites the users searched for the keyword and their keyword ratings. FIG. 2F illustrates an exemplary keyword table 280 for KEYWORD1. The table 280 includes a web site column for storing all of the web sites that the users have searched for KEYWORD1 and a rating column for storing the keyword ratings of the web sites.

In step 514, the process 500 instructs the server 114 to determine if a search engine is specified by a user for conducting the keyword search. If the user specifies a search engine, such as search engine 102, the proper query string is submitted to the search engine and obtains and displays the search results returned from the search engine (step 518). If, on the other hand, the user does not specify a particular search engine, a default search engine or all of the available search engines are selected for conducting the keyword search (step 516).

According to an alternative embodiment, a user is allowed to select more than one category or web site and use different search engines for different categories or web sites when conducting the keyword search. For example, the user can select a "Music" category and a "Guitar" category for the keyword search. The user is allowed to conduct the search on the all "Music" web sites using GOOGLE and on all "Guitar" web sites using MICROSOFT BING.

In keeping with this embodiment, if a user conducts a keyword search without specifying a site or category, the entire Internet is searched using the search engine(s). Those search results as described above are presented to the user.

According to an alternative embodiment, the keyword search involving a web site also increases the keyword ratings of that web site for other keywords similar to the one specified by the user. For example, if a user conducts a keyword search using keyword "1969 Mustang" and the web site "www.classicmusclecars.com," in addition to increasing the keyword rating of the web site for keyword "1969 Mustang," the system also increases the keyword ratings of the web site for keywords that are similar to "1969 Mustang," such as "1970 Mustang," "1969 Charger," "1969 Corvette," etc.

Figure 7:
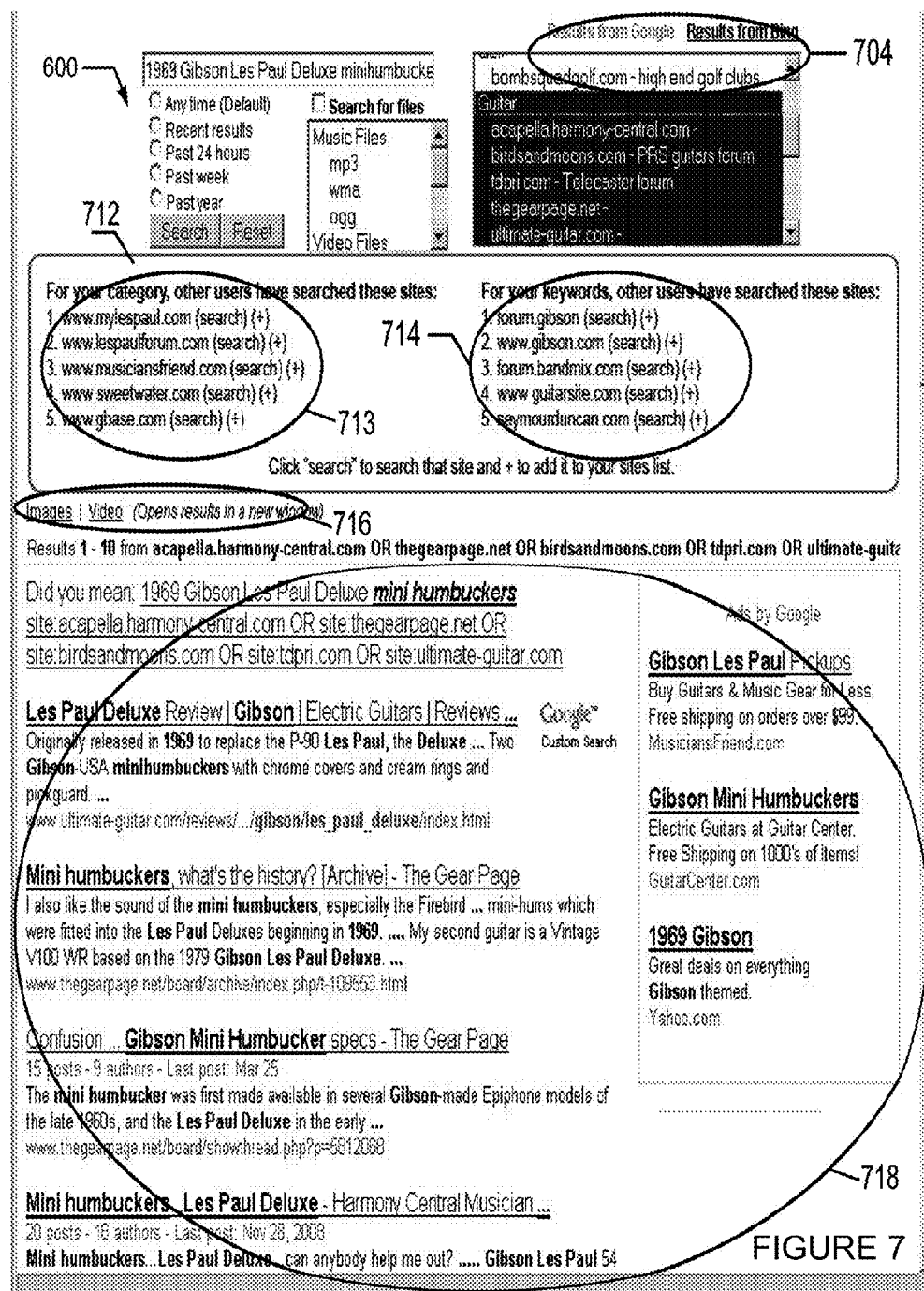
FIG. 7 depicts an exemplary user interface for displaying and managing search results generated by the customized web search.

FIGS. 6 and 7 depict one embodiment of a user interface for the user to customize keyword search according to the process 500. Similarly to interfaces 300 and 400, the interface 600 also includes a number of fields for the user to interact with the process 500. In particular, interface 600 includes a search keyword field 602 for the user to input search keywords. Web site selection field 604 allows a user to select through a mouse or keyword one or more web sites listed in the field 604. As shown in FIG. 6, the user can select the web sites by highlighting them individually. Alternatively, if the user selects a category, such as "Guitar," all of the web sites under the user's "Guitar" category are automatically selected and highlighted. The interface 600 further includes a time frame field 606 and a file type field 608 that allow the user to limit the search results to certain time period and file type. For example, if the option "Past 24 hours" is selected, the interface 600 only displays search results posted within the past 24 hours. Alternatively, if the "mp3" file type is selected, the interface 600 only displays search results containing mp3 files. Multiple file types may be selected at the same time. For example, a user can select both "mp3" and "wma" formats for a music search.

The interface 600 further includes a reset button 612 for the user to clear the inputs and selections in fields 602, 604, 606, and 608.

After inputting the keywords and making necessary selections in field 602, 604, 606, and 608, the user can click the search button 610 to start the process 500 for keyword search and web site rating. As shown in FIG. 7, in response to the user-initiated web search, the interface 600 displays the search results obtained according to the process 500 in result field 718.

According to the embodiment depicted in FIG. 7, the interface 600 provides a number of fields for the user to further customize the search results. For example, the interface 600 includes a field 704 for the user to select a particular search engine for conducting the keyword search. As shown in FIG. 7, when the "Results from Google" option is selected, the result field 718 only displays the search results obtained from the GOOGLE search engine. Alternatively, if the "Results from Bing" option is selected, the result field 718 will display the results obtained from the BING search engine. Although not shown, options for displaying results from other search engines can also be included in the field 704 of the interface 600.

Alternatively, the interface 600 includes a group of radio buttons (not shown) for selecting which search engine(s) to perform the web search. For example, each of the radio buttons is used to indicate a search engine such as GOOGLE, BING, YAHOO!, etc. The user can choose one or more of these search engines for the web search by choosing the radio buttons representing them. The result page 718 then shows the search results obtained from the search engine(s) selected by the user.

The interface 600 further includes a field 716 for displaying search results of a particular type. As shown in FIG. 7, the field 716 includes an "Images" and a "Video" links. When the user clicks one of these links, the research results of the image type or video type are displayed to the user.

The interface 600 further includes a recommended site field 712 for displaying to the user a number of web sites recommended by the system based on web site rating. As shown in FIG. 7, the recommended site field 712 includes a list of recommended sites (list 713) for the category that the user has selected in process 500 and a list of recommend sites (list 714) for the keywords that the user has searched for. For example, in FIG. 7, the user selects the "Guitar" category for conducting the keyword search. Accordingly, the list 713 shows a number of web sites from the table 270 associated with the "Guitar" category. The web sites are listed in their category ratings' descending order for the "Guitar" category. The list 714 shows a number of web sites from the table 280 associated with the keyword that the user has searched for. Similarly, the web sites are listed in their keyword ratings' descending order for that keyword. The web sites' ratings are updated as described above with respect to processes 200, 230, and 500.

In an alternative embodiment, the interface 600 also includes a list of recommended web sites in accordance with the global rating. For example, after the user conducts a web search, all of the web sites within the database 116 are ranked according to their global ratings. The interface 600 then displays a ranked list of the web sites in the global rating's descending order, showing the most popular web sites on the top of the list followed by the next most popular web site.

With respect to the web site rating, the number of points added to or taken from each web site's rating is determined by the design of the system. For example, when a web site is added into the system, the global rating of the web site is increased by one (1) point. When the user adds the web site to a certain category, the web site's rating for that category is increased by one (1) point. When the user removes a web site from a category, the web site's rating for that category is decreased by one (1) point. When the user conducts a keyword search by selecting a web site from a category, the web site's rating for the category and the rating for the keyword are each increased by one (1) point. One skilled in the art will recognize that the users' operations can also increase or decrease a web site's rating by more than one (1) point.

As discussed above, the rating of each web site stored in the database 116 is a measure of the popularity of the web site. For example, the global rating of the web site reflects a system-wide popularity of the web site among the user population including all the users of the system 100. The category rating of the web site reflects the popularity of the web site for the given category. The more users add the web site to the same category or the more users conduct keyword search on the web site for the category, the higher the rating of the web site for the category. Similarly, the keyword rating reflects the popularity of the web site for the given keyword. The more users search the keyword on the web site, the higher the keyword rating of the web site for that keyword.

According to another embodiment, the web site rating system described herein can be used to promote commercial web sites and to generate revenues for the operator of the system 100. In particular, a customer can purchase from the system operator a number of points to be added to the rating of a particular web site, so that the web site will appear toward the top in lists 713 and 714 in the interface 600. For example, in FIG. 7, the customer who owns the "thegearpage.net" web site can purchase a number of points from the system operator and add those points to the rating of the "thegearpage.net" web site for the "Guitar" category. The points added to the rating of the web site will move the "thegearpage.net" web site to or close to the top of list 713 for the "Guitar" category. As a result, other users searching within the "Guitar" category will more readily notice the web site and will be more inclined to select the "thegearpage.net" web site to customize their keyword search. Alternatively, a person who has an interest in the web site can also purchase points for the web site to be added to its rating.

Similarly, a web site's owner can also purchase points from the system operator to be added to the web site's rating for certain keywords. The web site's owner can use the keyword rating to promote the services and products provided by the web site. For example, in FIG. 7, the owner of the "thegearpage.net" web site can purchase points and add the points to the web site's rating for the keyword "Gibson Les Paul Deluxe," so that the web site will appear toward the top of list 714 every time a user searches for the guitar product named "Gibson Les Paul Deluxe." As a result, the web site will be more noticeable to the user who will be more inclined to search for and purchase the product from the "thegearpage.net" web site.

According to a further embodiment as shown in FIG. 7, when the user clicks the "+" sign arranged after each web site in the list 713 or 714, the selected web site is automatically added to the current category (i.e., the "Guitar" category) or any category selected by the user. When the user clicks the "search" sign after each web site in the list 713 or 714, a keyword search is performed on that selected web site.

As discussed above, the processes 200, 230, and 300 may be implemented in the form of web applications running on the application server 114. When a user connects to the application server 114 through the user terminal 112, user interfaces 300, 400, and 600 are rendered on the user terminal 112 for the user to interact with the processes 200, 230, and 300.

According to some other embodiment, a user of the system 100 can create a list of his favorite web sites and group them under various categories as needed. The user can then search any of those web sites directly from the search interface such as interface 600. Other users of the system cannot see or manipulate his site lists or his categories, nor can be see sites others users' site lists or categories.

The system 100 can also rate these web sites based on how many times the global user population searches them for specific keywords and/or how many times they are added by the user population to their own lists and categories.

Based on these ratings, the system 100 presents a list of sites (e.g., top 5 or 10 sites) to any user who searches for the same or similar keywords or categories. In addition, advertisers can buy rating points to push their sites up closer to the top for specific keywords and categories.

In an exemplary embodiment, 1000 different users created a category called "Guitar" and all added the web site "www.guitar.com" to the category. If a user "Joe" conducts a web search in his own "Guitar" category for keyword "les paul," the system 100 can determine that user "Joe" searches his "Guitar" category and then presents the web site "www.guitar.com" as a recommended site, if the web site "www.guitar.com" has a category rating for the "Guitar" category that is within the top 5 or 10 sites within the "Guitar" category.

Additionally, the system 100 can also determine that user "Joe" searches for the keyword "les paul" and determine what web sites other users have included in their web searches for the same keyword "les paul." If a lot of other users have searched "www.guitar.com" so that its keyword rating for keyword "les paul" is within the top 5 or 10 sites for the keyword, then the site would be listed as a recommended site.

Furthermore, if "www.guitar.com" web site's owners purchase points for the "les paul" keyword or the "Guitar" category, the system 100 then adds those points to the corresponding rating so that it will be shown to a user searching for the "les paul" keyword or the "Guitar" category.

In keeping with another embodiment, the Interfaces 300, 400, and 600 are implemented as a browser plug-in rendered as a toolbar on a web browser such as MICROSOFT INTERNET EXPLORER, FIREFOX, etc. One skilled in the art will readily understand how to implement this interface after reading the description.

According to another embodiment, a user of the system 100 can send or transfer his/her categories and/or web sites to another person who may or may not be a user of the system 100. For example, the user "Joe" may select the "Guitar" category including all of the web sites therein. The interface 600 then provides the user "Joe" with a list of the users of the system so that "Joe" can select another user, such as "Mike," from the list to send the "Guitar" category. The system then generates a message and presents the message to the user "Mike" as soon as "Mike" logs onto the system, indicating that he has received a category sent by "Joe." The user "Mike" can choose to accept the category or reject it. If the user "Mike" chooses to accept the category, the system 100 then makes a copy of the "Guitar" category from "Joe's" account and all of the web site therein and transfers the copy to "Mike's" account. Specifically, the system 100 generates more entries in the main sites table 282 for storing the "Guitar" category including the web sites that are newly added. At the same time, the system 100 also updates the category table 284 and keyword table 286 accordingly to reflect the newly added "Guitar" category.

Alternatively, the system may allow a user to send the selected category to a person via email. For example, after selecting the "Guitar" category, the user "Joe" can input an email address in an email field provided on interface 600 and click a "send" button to instruct the system 100 to generate and send an email message including the selected "Guitar" category. Still alternatively, the selected category may also be sent via a text message to a cell phone or smart phone device. The interface 600 may provide the user with a phone number field for specifying the phone device to send the selected category.

In an alternative embodiment, the system 100 also allows a user to select and transfer one or more categories and web sites to another person, who may or may not be a user of the system.

In still an alternative embodiment, the system 100 allows a user to make some or all of their sites and categories public, that is, viewable by other users.

Specifically, the system 100 provides a user with an interface, which allows the user to add another user's profile into a "Favorite User List." For example, if User 1 adds User 2 to his/her "Favorite User List," the interface provided by the system 100 allows User 1 to click on User 2's profile to view User 2's public sites and categories list and to search them in the same manner he/she searches on User 1's own sites and categories. Alternatively, the interface provided by the system 100 allows User 1 to import User 2's public sites and categories into his own sites and categories list, thereby including these imported sites and categories into User 1's account.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for communications over a network comprising the steps of:
   - receiving a search query from a first location on a network;
   - determining, by querying a database over said network, results of said search query and ranking said results based on predetermined criteria;
   - determining which pre-defined group, defined by a person associated with said first location on said network, which at least one said result of said search query exists within;
   - modifying said ranking by raising said at least one said result which exists in said group;
   - sending data via said network to said first location comprising said results of said search query as modified by said raising said at least one said result which exists in said group;
   - wherein before said step of receiving, a group is created by a third party and information representing same is received from a second location on said network; and
   - said step of modifying includes modifying said ranking by raising said at least one said result which exists in either said group defined by a person associated with said first location or a person associated with said second location on said network.

2. The method of claim 1, wherein payment is received by said third party for said group to be used for said step of modifying.

3. The method of claim 1, wherein said group created by a third party is a plurality of groups, each created by different third parties, each said group of said plurality of groups comprising a list of websites;
   - wherein the more times a particular website appears in said plurality of groups the more weight is given to raising a ranking of said website when said website appears in said results of said search query.

* * * * *